US010408087B2

(12) United States Patent
Snyder et al.

(10) Patent No.: US 10,408,087 B2
(45) Date of Patent: Sep. 10, 2019

(54) TURBINE ROTOR SEGMENTED SIDEPLATES WITH ANTI-ROTATION

(71) Applicant: United Technologies Corporation, Hartford, CT (US)

(72) Inventors: Daniel A. Snyder, Manchester, CT (US); Christopher Corcoran, Manchester, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 709 days.

(21) Appl. No.: 14/838,880

(22) Filed: Aug. 28, 2015

(65) Prior Publication Data

US 2016/0130977 A1    May 12, 2016

Related U.S. Application Data

(60) Provisional application No. 62/076,983, filed on Nov. 7, 2014.

(51) Int. Cl.
| | |
|---|---|
| *F01D 25/24* | (2006.01) |
| *F02C 3/04* | (2006.01) |
| *F01D 5/30* | (2006.01) |

(52) U.S. Cl.
CPC ........... *F01D 25/24* (2013.01); *F01D 5/3015* (2013.01); *F02C 3/04* (2013.01); *F05D 2250/184* (2013.01); *F05D 2250/712* (2013.01)

(58) Field of Classification Search
CPC . F01D 25/12; F01D 25/24; F01D 5/14; F01D 5/18; F01D 5/186; F01D 5/187; F01D 5/141; F01D 5/30; F01D 5/3015; F01D 9/02; F01D 9/04; F01D 9/041; F01D 11/00; F01D 11/08; F02C 3/04; F05D 2250/184; F05D 2250/712
USPC ......................................................... 60/805
See application file for complete search history.

(56) References Cited

U.S. PATENT DOCUMENTS

| | | | | |
|---|---|---|---|---|
| 3,501,249 | A | * | 3/1970 | Scalzo .................... F01D 5/081 416/193 A |
| 4,659,285 | A | | 4/1987 | Kalogeros et al. |
| 5,257,909 | A | * | 11/1993 | Glynn ................... F01D 5/3015 416/219 R |
| 5,339,619 | A | | 8/1994 | Antonellis |

(Continued)

FOREIGN PATENT DOCUMENTS

| | | | | | |
|---|---|---|---|---|---|
| DE | 102011082493 | * | 3/2013 | ............... | F01D 5/32 |
| EP | 1944472 | * | 7/2008 | ............... | F01D 5/30 |

(Continued)

OTHER PUBLICATIONS

Machine translation of EP1944472.*

(Continued)

*Primary Examiner* — Phutthiwat Wongwian
*Assistant Examiner* — Loren C Edwards
(74) *Attorney, Agent, or Firm* — Snell & Wilmer, L.L.P.

(57) ABSTRACT

A segmented sideplate for use in a gas turbine engine is described. The segmented sideplate includes a first plate having a first circumferential edge configured to interface with a complementary circumferential edge. The segmented sideplate also includes a second plate having a second circumferential edge configured to interface with the first circumferential edge.

15 Claims, 7 Drawing Sheets

(56) References Cited

U.S. PATENT DOCUMENTS 6,190,131 B1 * 2/2001 Deallenbach ........... F01D 5/027
　　　　　　　　　　　　　　　　　　　　　　　　 416/144
2014/0314578 A1 * 10/2014 Xu ........................... F01D 5/10
　　　　　　　　　　　　　　　　　　　　　　　　 416/220 R

FOREIGN PATENT DOCUMENTS

EP　　　2011966　　　1/2009
GB　　　1209419　　　10/1970

OTHER PUBLICATIONS

Extended European Search Report dated May 4, 2016 in European Application No. 15183436.3.
European Office Action, European Office Action dated Jul. 10, 2018 in Application No. 15183436.3-1008.

* cited by examiner

TURBINE ROTOR SEGMENTED SIDEPLATES WITH ANTI-ROTATION

CROSS-REFERENCE TO RELATED APPLICATIONS

This application is a nonprovisional of, and claims priority to, and the benefit of U.S. Provisional Application No. 62/076,983, entitled "TURBINE ROTOR SEGMENTED SIDEPLATES WITH ANTI-ROTATION ," filed on Nov. 7, 2014, which is hereby incorporated by reference in its entirety.

GOVERNMENT RIGHTS

These inventions were made with government support under FA 8650-09-D-2923-0021 awarded by The United States Air Force. The government has certain rights in the disclosure.

FIELD

The present disclosure relates generally to a gas turbine engine and more specifically to a sideplate for use in a compressor or turbine section of a gas turbine engine.

BACKGROUND

A gas turbine engine may include a turbine section with multiple rows or stages of stator vanes and rotor blades that interact or react with a high temperature gas flow to create mechanical power. A gas turbine engine may also include a compressor section with multiple rows or stages of stator vanes and vanes that compress a fluid. In a gas turbine engine, the each stage of blades and vanes may be positioned adjacent a sideplate for preventing and/or directing flows of air.

The blades and vanes, and accordingly, the sideplates, may be subjected to relatively high temperatures and pressures, particularly in portions of the turbine section and compressor section nearest a combustor section of the gas turbine engine. These high pressures and temperatures may be stressors to the sideplates.

SUMMARY

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

A segmented sideplate for use in a gas turbine engine is described. The segmented sideplate includes a first plate having a first circumferential edge configured to interface with a complementary circumferential edge. The segmented sideplate also includes a second plate having a second circumferential edge configured to interface with the first circumferential edge.

Also described is a gas turbine engine. The gas turbine engine includes a compressor section and a combustor section. The gas turbine engine also includes a turbine section including a segmented sideplate encircling the axis of rotation of the gas turbine engine. The segmented sideplate includes a first plate having a first circumferential edge configured to interface with a complimentary circumferential edge. The segmented sideplate also includes a second plate having a second circumferential edge configured to interface with the first circumferential edge.

Also described is a plate for use in a segmented sideplate of a gas turbine engine. The plate includes a first circumferential edge and a second circumferential edge. The plate also includes a first joint feature on the first circumferential edge that is configured to interface with a complimentary joint feature. The plate also includes a second joint feature on the second circumferential edge that is configured to interface with a complimentary joint feature. The plate also includes a first protrusion and a second protrusion each extending radially outward from the plate and separated by a middle segment. A portion of an airfoil may be positioned in an area between the first protrusion and the second protrusion such that it engages with at least one of the first protrusion or the second protrusion in order to maintain a position of the plate relative to the airfoil.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

An X-Y-Z axis is shown to illustrate the circumferential, radial and axial directions. The Z axis corresponds to the axial direction, the Y axis corresponds to the radial direction and the X axis corresponds to the circumferential direction.

As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion.

Figure 1:
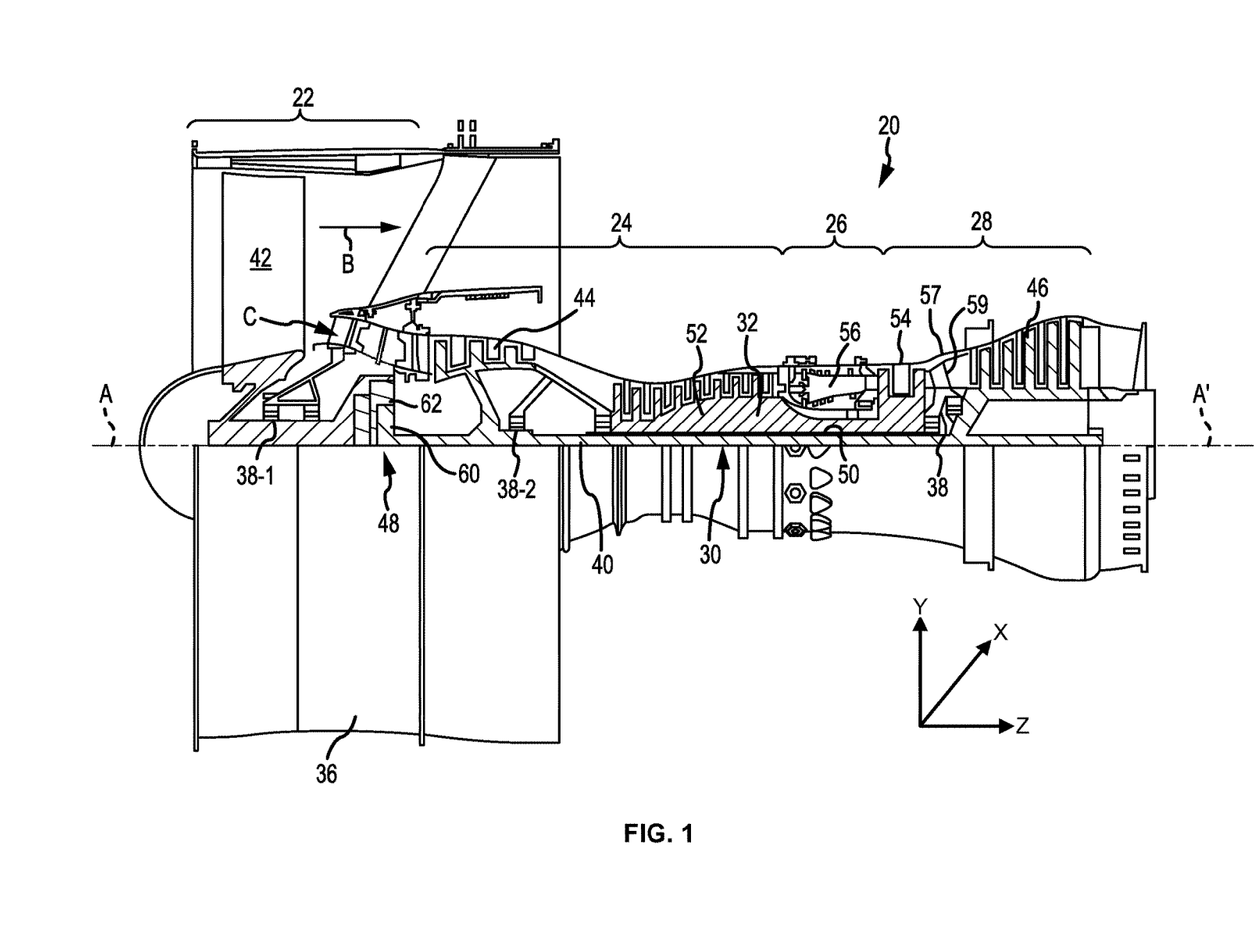
FIG. 1 is cross-sectional view of an exemplary gas turbine engine in accordance with various embodiments.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive coolant along a bypass flow-path B while compressor section 24 can drive coolant along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 via several bearing systems 38, 38-1, and 38-2. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure (or first) compressor section 44 and a low pressure (or first) turbine section 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure (or second) compressor section 52 and high pressure (or second) turbine section 54. A combustor 56 may be located between high pressure compressor 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28 Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor section 44 then high pressure compressor 52, mixed and burned with fuel in combustor 56, then expanded over high pressure turbine 54 and low pressure turbine 46. Mid-turbine frame 57 includes airfoils 59 which are in the core airflow path. Turbines 46, 54 rotationally drive the respective low speed spool 30 and high speed spool 32 in response to the expansion.

Gas turbine engine 20 may be, for example, a high-bypass geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Gear architecture 48 may have a gear reduction ratio of greater than about 2.3 and low pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low pressure compressor section 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other turbine engines including direct drive turbofans.

In various embodiments, the next generation of turbofan engines may be designed for higher efficiency which requires higher pressure ratios and higher temperatures in high pressure compressor 52. These higher operating temperatures and pressure ratios may create operating environments that may cause thermal loads that are higher than the thermal loads which may shorten the endurance life of current components.

Figure 2:
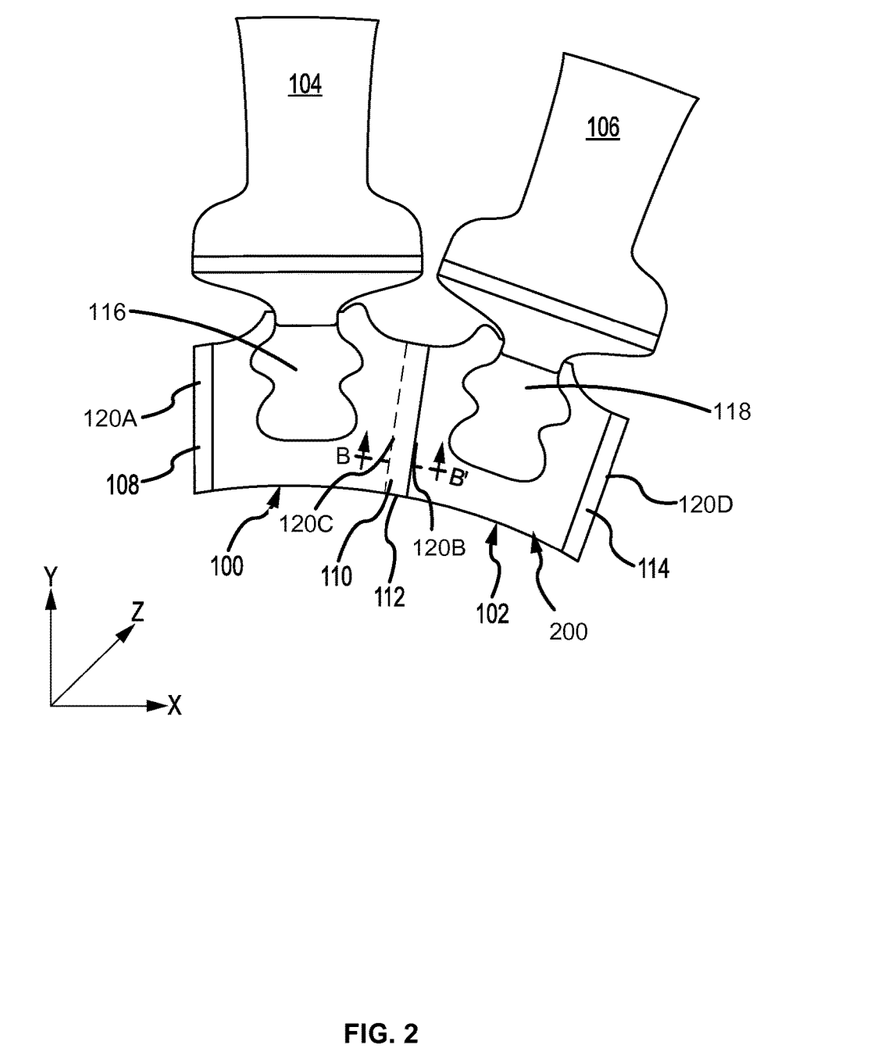
FIG. 2 illustrates a portion of a segmented sideplate including a first plate and a second plate in accordance with various embodiments.

FIG. 2 illustrates a portion of a segmented sideplate including a plate 100 and a plate 102. The segmented sideplate may include a number of plates such as plate 100 and 200 such that the collection of plates encircles the axis of rotation of gas turbine engine 20. An X-Y-Z axis is shown to illustrate the circumferential (X axis), the radial (Y axis) and the axial (Z axis) directions. The segmented sideplate may block a flow of air from flowing through blade flaps in turbine section 28 or compressor section 24.

Traditionally, sideplates included a single, integrated piece of material that encircles the axis of rotation. In turbine section 28 and/or compressor section 24, temperatures and ambient pressure may be relatively high. These temperatures and pressures may cause a non-segmented sideplate to compress and potentially crack due to overheating. In order to overcome this issue, a segmented sideplate may include separate plates such that the separate plates may move relative to each other in order to avoid cracking due to the high temperatures and pressures. For example, the portion of the segmented sideplate illustrated in FIG. 2 includes plate 100 and plate 102. In order to form an entire segmented sideplate, additional plates may be added to plate 100 and plate 102 such that all the plates together encircle the axis of rotation.

An airfoil may be positioned relative to each plate, such as airfoil 104 being positioned relative to plate 100 and airfoil 106 being positioned relative to plate 102. Airfoil 104 and airfoil 106 may be a rotor in turbine section 28 or a blade in compressor section 24. Airfoil 104 may have a portion 116 that is adjacent plate 100. Airfoil 106 may have a portion 118 that is positioned adjacent plate 102. Portion 116 and portion 118 may be coupled to a rotor disk such that when the rotor disk rotates, airfoil 104 and airfoil 106 rotate at the same angular speed as the rotor disk.

Each plate of the segmented sideplate may include a joint feature on either circumferential end 120 of the plate. For example, plate 100 may have joint feature 108 on circumferential end 120A and joint feature 110 on circumferential end 120B of plate 100. Plate 102 may have a joint feature 112 on circumferential end 120C and a joint feature 114 on circumferential end 120D of plate 102. The joint features may allow the plates to be stacked adjacent each other in the circumferential direction and to form a seal between the plates. For example, joint feature 110 and joint feature 112 may overlap, allowing plate 100 to be stacked adjacent plate 102 and to seal the joint between plate 100 and plate 102.

Figure 3:
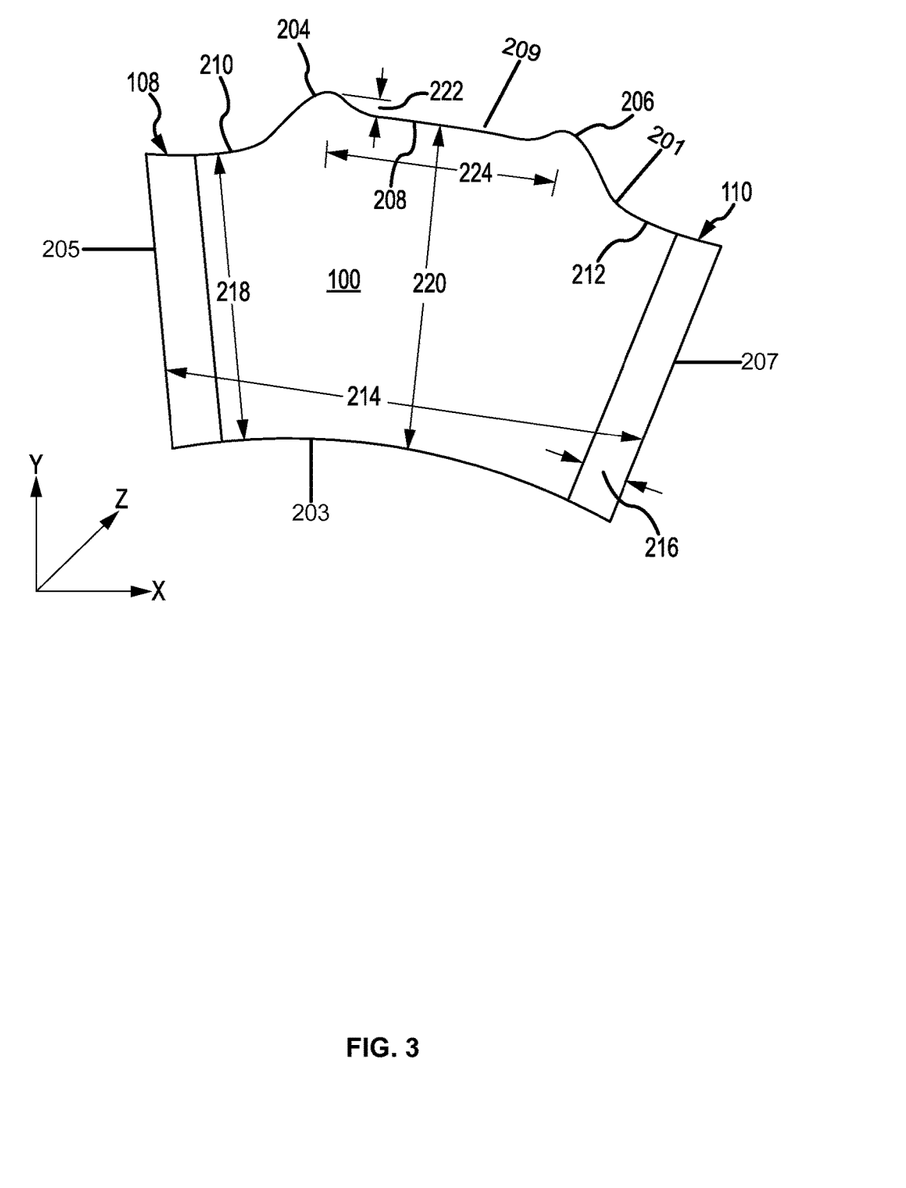
FIG. 3 illustrates a plate of a segmented sideplate in accordance with various embodiments.

FIG. 3 illustrates plate 100 without airfoil 104 or plate 102 adjacent to plate 100. For reference, the X-Y-Z axis is shown to illustrate the circumferential, radial and axial directions. Plate 100 may include an outer diameter edge 201 at the radially outward edge of plate 100. Plate 100 may include an inner diameter edge 203 at the radially inward edge of plate 100. Plate 100 may also include a first circumferential edge 205 and a second circumferential edge 207 on the circumferential ends of plate 100. Joint feature 108 is positioned adjacent first circumferential edge 205 and joint feature 110 is positioned adjacent second circumferential edge 207.

Outer diameter edge 201 may include anti-rotation features, such as anti-rotation feature 204 and an anti-rotation feature 206. Anti-rotation feature 204 and anti-rotation feature 206 may be a protrusion in the radially outward direction from outer diameter edge 201. A first middle segment 208 may exist between anti-rotation feature 204 and anti-rotation feature 206. First middle segment 208 may be a section of outer diameter edge 201 between anti-rotation feature 204 and anti-rotation feature 206. First middle segment 208 may be planar, cylindrical or the like. Radially outward from first middle segment 208 and between anti-rotation feature 204 and anti-rotation feature 206 may be an area 209. With momentary reference to FIG. 2, airfoil 104 may include a hook to be positioned in area 209. When airfoil 104 rotates about the axis of rotation (line A-A' of FIG. 1), anti-rotation feature 204 and 206 may engage with the hook such that plate 100 retains its position relative to airfoil 104.

Towards first circumferential edge 205 from anti-rotation feature 204 on outer diameter edge 201 may be a first outer segment 210. Likewise, towards second circumferential edge 207 from anti-rotation feature 206 may be a second outer segment 212. First outer segment 210 and second outer segment 212 may be planar, cylindrical or the like.

A distance 214 may represent the distance between first circumferential edge 205 and second circumferential edge 207. A distance 220 may represent the distance between outer diameter edge 201 and inner diameter edge 203. In various embodiments, distance 214 may be larger than distance 220 or distance 220 may be larger than distance 214.

A distance 222 may exist between first middle segment 208 and the farthest radially outward position of anti-rotation feature 204 and 206. A distance 224 may be a distance in the circumferential direction between the most radially outward point of anti-rotation feature 204 and anti-rotation feature 206. Distance 224 may be selected based on the features of airfoil 104, such that area 209 is sufficiently sized to interface with the airfoil 104. In various embodiments, distance 222 may be larger than distance 224 or distance 224 may be larger than distance 222.

A distance 218 may exist from inner diameter edge 203 to outer diameter edge 201 at first outer segment 210 and at second outer segment 212 of outer diameter edge 201. Distance 218 may be less than distance 220 between inner diameter edge 203 and first middle segment 208 of outer diameter edge 201. This may allow the first and second outer segments of two adjacent plates to align and form a void in the circumferential direction between anti-rotation features. This void may allow a flow of air to be directed around the segmented sideplate.

In various embodiments, joint feature 110 may have a distance 216 that is between 0.01 and 0.5 inches (0.0254 cm to 1.27 cm). In various embodiments, distance 216 is between 0.1 and 0.25 inches (0.254 cm to 0.638 cm). In various embodiments, distance 216 may be greater than or less than these ranges. Joint feature 108 may have a similar distance.

Figure 4:
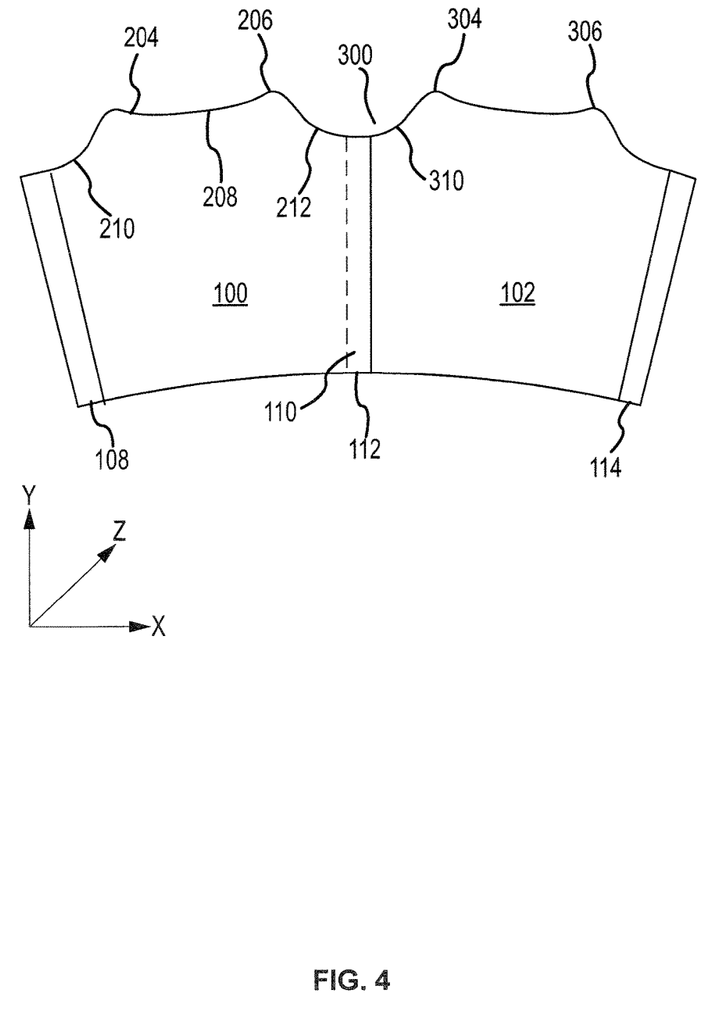
FIG. 4 illustrates a plate of a segmented sideplate adjacent another plate of the segmented sideplate with overlapping joint features in accordance with various embodiments.

FIG. 4 illustrates plate 100 adjacent plate 102 with joint feature 110 overlapping joint feature 112. For reference, the X-Y-Z axis is shown to illustrate the circumferential, radial and axial directions.

As illustrated, joint feature 110 is aligned with joint feature 112 such that joint feature 110 and joint feature 112 are in the same position in the circumferential and radial directions. In various embodiments, joint feature 110 may be forward of joint feature 112 or joint feature 110 may be aft from joint feature 112. In embodiments having tongue-and-groove joint features, joint feature 110 may be both forward and aft of joint feature 112 and joint feature 112 may be both forward and aft of joint feature 110. The overlap of joint feature 110 and joint feature 112 creates a seal between plate 100 and plate 102 such that a large volume of air may not flow between plate 100 and plate 102. The joint features of the plates may be a shiplap edge, a tongue-and-groove edge or the like. These joint features may allow plate 100 to move relative to plate 102. In this fashion, when plate 100 and plate 102 are subjected to high temperatures, plate 100 can move relative to plate 102 such that in response to high pressure and/or temperatures, plate 100 will tend to resist cracking Otherwise, if all plates were bonded together, when subjected to high stress and high temperatures, the segmented sideplate may crack under the high pressure and temperature.

In FIG. 4, it is illustrated how second outer segment 212 of plate 100 aligns with first outer segment 310 of plate 102. When second outer segment 212 and first outer segment 310 are aligned, a concavity 300 is defined by plate 100 and plate 102 between anti-rotation feature 206 and anti-rotation feature 304. Concavity 300 may allow airflow in the axial direction. This flow of air may be directed by concavity 300 such that it follows a desired path.

Figure 5:
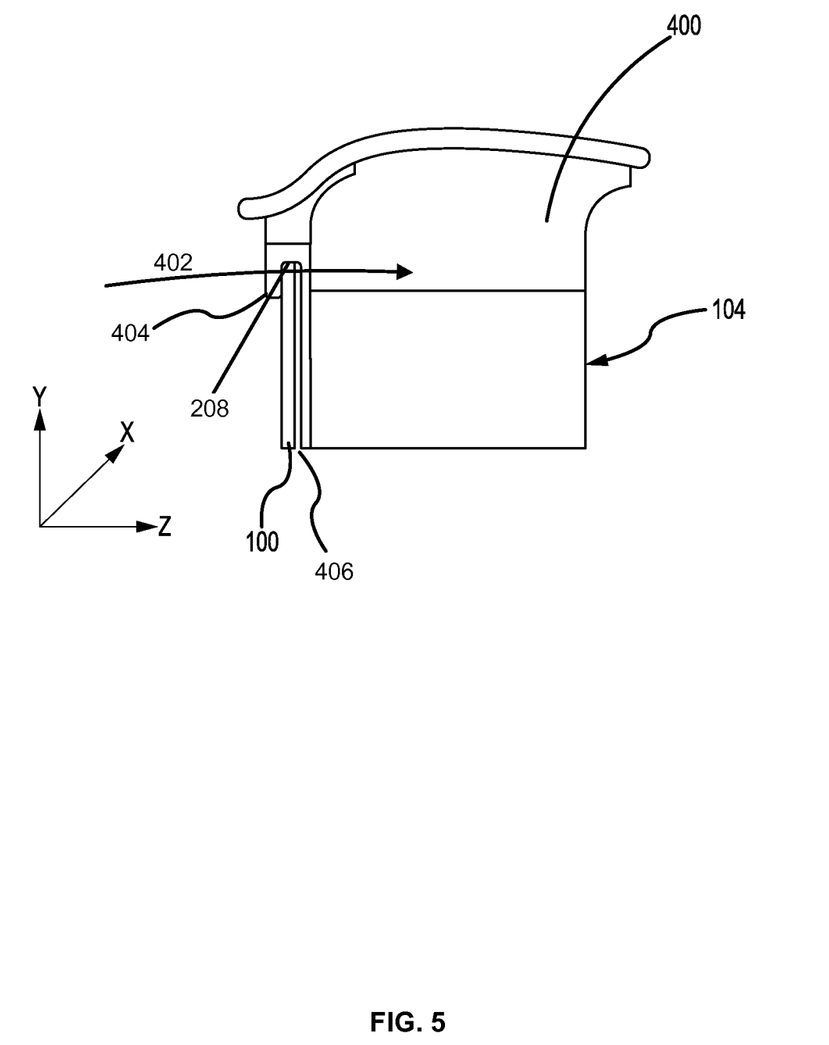
FIG. 5 illustrates an airfoil 104 with a hook for causing a plate of a segmented sideplate to remain in a desired position relative to the airfoil in accordance with various embodiments.

FIG. 5 illustrates airfoil 104 with a hook 404 for causing plate 100 to remain in a desired position relative to airfoil 104. The X-Y-Z axis is shown to illustrate the circumferential, radial and axial directions. As shown in FIG. 5, airfoil 104 includes a hook 404 in the forward direction (i.e., the negative Z direction) from airfoil 104. Plate 100 is also positioned in the forward direction (i.e., the negative Z direction) from airfoil 104. As illustrated, hook 404 may contact plate 100 at the first middle segment 208 of plate 100. With brief reference to FIG. 3, hook 404 may be positioned between anti-rotation feature 204 and anti-rotation feature 206. When airfoil 104 rotates in the circumferential direction, hook 404 will cause plate 100 to remain in a fixed position relative to airfoil 104 along the X axis because hook 404 may engage anti-rotation feature 204 and/or anti-rotation feature 206.

Also illustrated in FIG. 5 is a cavity 400. Cavity 400 may be positioned in either circumferential direction from airfoil 104. With brief reference to FIG. 4, concavity 300 may align with cavity 400. As previously mentioned, concavity 300 may allow a flow of air. With renewed reference to FIG. 5, this flow of air through concavity 300 may flow into cavity 400. This flow of air into cavity 400 may pressurize cavity 400. This pressurization may be desirable. Arrow 402 illustrates this flow of air through concavity 300 into cavity 400.

Also illustrated is a void 406 positioned between plate 100 and airfoil 104. In various embodiments, void 406 does not exist. However, hook 404 may not cause plate 100 to be fully in contact with airfoil 104, thus resulting in void 406.

Figure 6:
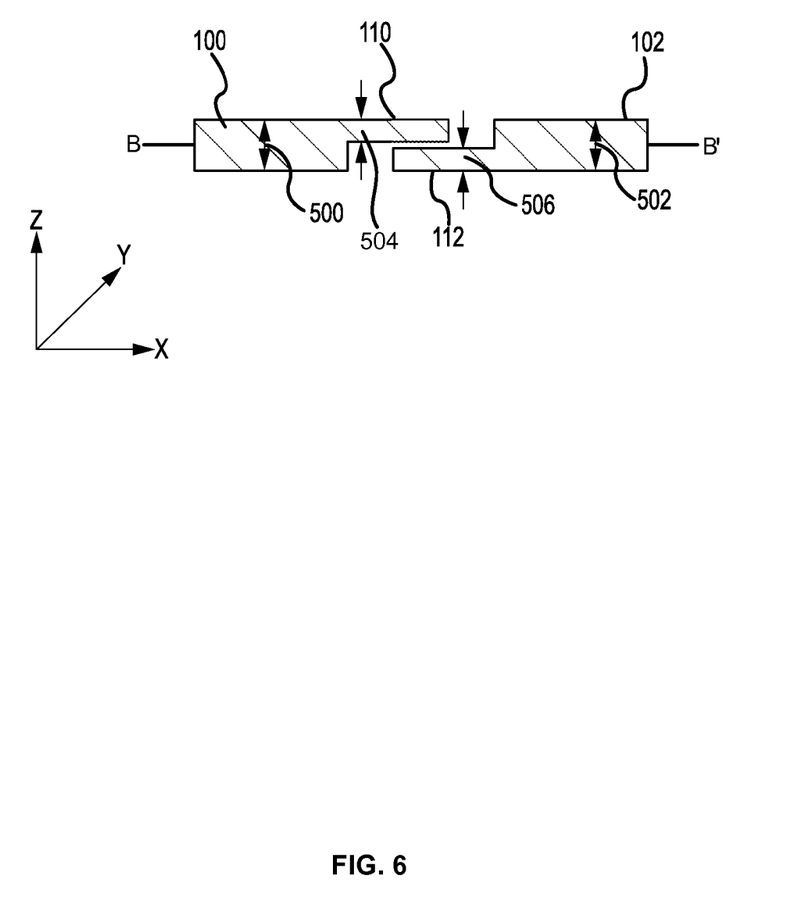
FIG. 6 illustrates a plate of a segmented sideplate adjacent another plate of the segmented sideplate as viewed in the radial direction in accordance with various embodiments.

FIG. 6 illustrates plate 100 adjacent plate 102 as viewed in the radial direction. The X-Y-Z axis is shown to illustrate the circumferential, radial and axial directions. As illustrated, joint feature 110 and joint feature 112 are shiplap edges. However, joint feature 110 and joint feature 112 may be a tongue-and-groove feature or other similar feature. Joint feature 110 is illustrated to be forward of joint feature 112.

Plate 100 may have an axial distance 500 which may be the same as an axial distance 502 of plate 102. Joint feature 110 has a distance 504 in the axial direction which may be the same as distance 506 in the axial direction of joint feature 112. In various embodiments, distance 504 may be between forty percent and fifty percent (40% and 50%) as large as distance 500.

Plate 100 may be positioned relative to plate 102 as illustrated in FIG. 6, such that joint feature 110 is partially adjacent joint feature 112 in the axial direction. In various embodiments, joint feature 110 may be positioned entirely adjacent joint feature 112 in the axial direction. By joint feature 110 partially adjacent joint feature 112 in the axial direction, as illustrated in FIG. 6, plate 100 may move in the circumferential direction (i.e., along the X axis) relative to plate 102. This allows each plate of the segmented sideplate to be able to move in the circumferential direction (i.e., along the X axis) relative to other plates of the segmented sideplate. In this fashion, when the segmented sideplate is exposed to high temperature and pressure, the segmented sideplate will tend to resist cracking due to the pressure and temperature.

Figure 7:
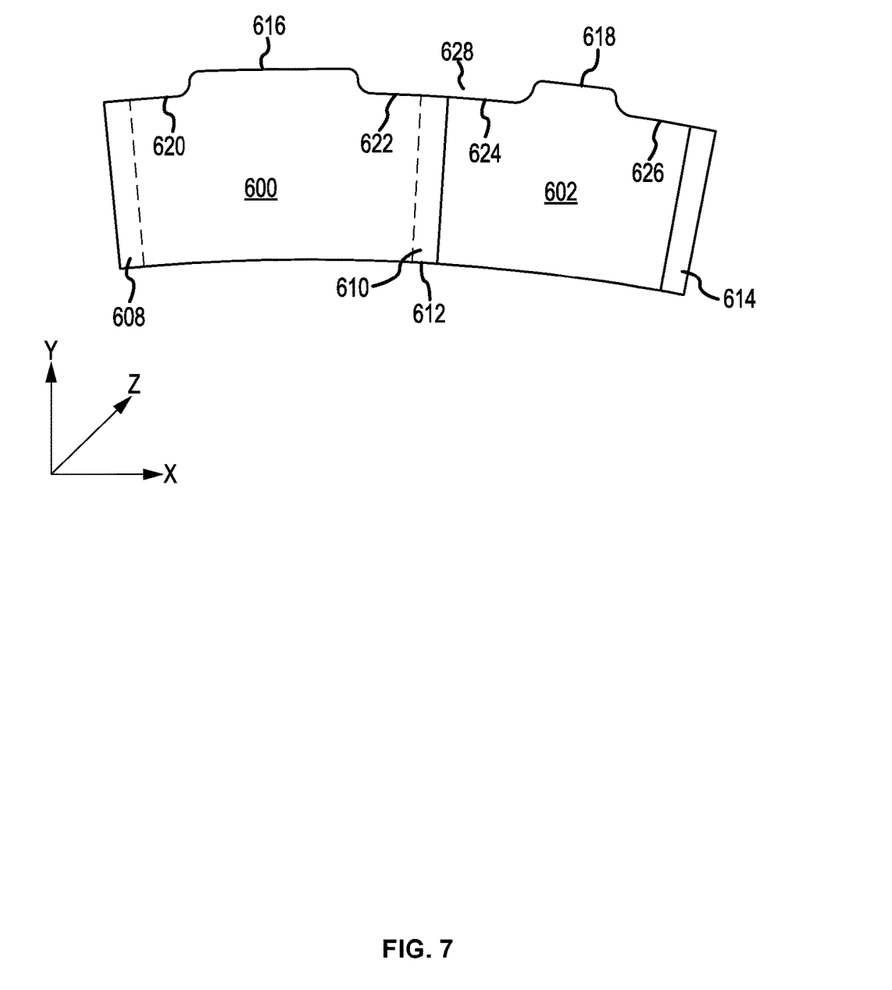
FIG. 7 illustrates a portion of a segmented sideplate in accordance with various embodiments.

FIG. 7 illustrates a portion of a segmented sideplate in accordance with various embodiments. The X-Y-Z axis is shown to illustrate the circumferential, radial and axial directions. The portion of the segmented sideplate includes a plate 600 and a plate 602. Plate 600 may include a joint feature 608 and a joint feature 610 on the circumferential ends of plate 600. Plate 602 may include a joint feature 612 and a joint feature 614 on the circumferential ends of plate 602. Joint feature 610 may overlap with joint feature 612 and form a seal between plate 600 and plate 602. Joint features of plate 600 and plate 602 may be, for example, shiplap edges, tongue-and-groove edges, or the like.

Plate 600 may include an anti-rotation feature 616 and plate 602 may include an anti-rotation feature 618. Anti-rotation feature 616 and 618 may include a protrusion extending radially outward from plate 600 and plate 602 and having a surface. Towards the circumferential edges from anti-rotation feature 616 are a first outer segment 620 and a second outer segment 622. Towards the circumferential edges of plate 602 from anti-rotation feature 618 are a first outer segment 624 and a second outer segment 626. When plate 600 is positioned adjacent plate 602 in the circumferential direction, hook 404 of FIG. 5 may be positioned in a void 628 between anti-rotation feature 616 and anti-rotation feature 618. By engaging with hook 404 of FIG. 5, anti-rotation feature 616 and anti-rotation feature 618 may cause plate 600 and plate 602 to remain in position relative to airfoil 104 of FIG. 5.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A segmented sideplate to be positioned around an axis of rotation of a gas turbine engine, the segmented sideplate comprising:

a first plate having a first circumferential edge configured to interface with a complementary circumferential edge, a first outer diameter edge, and a first anti-rotation feature including a first protrusion and a second protrusion located circumferentially adjacent to the first protrusion, the first protrusion and the second protrusion each extending radially outward from the first outer diameter edge and being separated by a first middle segment of the first outer diameter edge such that a portion of a first airfoil engages with at least one of the first protrusion or the second protrusion in order to maintain a position of the first plate relative to the first airfoil; and a second plate having a second circumferential edge configured to interface with the first circumferential edge, a second outer diameter edge, and a second anti-rotation feature including a third protrusion and a fourth protrusion located circumferentially adjacent to the third protrusion, the third protrusion and the fourth protrusion each extending radially outward from the second outer diameter edge and being separated by a second middle segment of the second outer diameter edge such that a portion of a second airfoil engages with at least one of the third protrusion or the fourth protrusion to maintain a position of the second plate relative to the second airfoil, wherein the first circumferential edge and the second circumferential edge interface to form a void in a radial direction through which air may flow axially at a location radially outward from the first circumferential edge and the second circumferential edge.

2. The segmented sideplate of claim 1, wherein:
the first circumferential edge includes a first joint feature; and
the second circumferential edge includes a second joint feature that is positioned at least partially adjacent the first joint feature in an axial direction.

3. The segmented sideplate of claim 2, wherein the first joint feature and the second joint feature are shiplap edges.

4. The segmented sideplate of claim 2, wherein the first plate and the second plate each have a first distance in the axial direction and the first joint feature and the second joint feature each have a second distance in the axial direction that is between 40% and 50% of the first distance.

5. The segmented sideplate of claim 2, wherein the first joint feature and the second joint feature prevent air from flowing between the first plate and the second plate.

6. The segmented sideplate of claim 1, wherein the segmented sideplate is configured to be used in a high pressure turbine section of the gas turbine engine.

7. The segmented sideplate of claim 1, wherein:
the first plate further includes an inner diameter edge;
the first outer diameter edge includes a first outer segment separated from the first middle segment by the first protrusion; and
a first distance between the first middle segment of the first outer diameter edge and the inner diameter edge is greater than a second distance between the first outer segment of the first outer diameter edge and the inner diameter edge.

8. The segmented sideplate of claim 1, wherein the first plate and the second plate define a concavity centered around an intersection of the first plate and the second plate such that the concavity may direct a flow of air radially outward from the concavity and axially aft through the concavity.

9. A gas turbine engine comprising:
a compressor section;
a combustor section; and
a turbine section including a segmented sideplate encircling an axis of rotation of the gas turbine engine, the segmented sideplate including:
a first plate having a first circumferential edge configured to interface with a complementary circumferential edge, a first outer diameter edge, and a first anti-rotation feature including a first protrusion and a second protrusion located circumferentially adjacent to the first protrusion, the first protrusion and the second protrusion each extending radially outward from the first outer diameter edge and being separated by a first middle segment of the first outer diameter edge such that a portion of a first airfoil engages with at least one of the first protrusion or the second protrusion in order to maintain a position of the first plate relative to the first airfoil, and a second plate having a second circumferential edge configured to interface with the first circumferential edge, a second outer diameter edge, and a second anti-rotation feature including a third protrusion and a fourth protrusion located circumferentially adjacent to the third protrusion, the third protrusion and the fourth protrusion each extending radially outward from the second outer diameter edge and being separated by a second middle segment of the second outer diameter edge such that a portion of a second airfoil engages with at least one of the third protrusion or the fourth protrusion to maintain a position of the second plate relative to the second airfoil, wherein the first circumferential edge and the second circumferential edge interface to form a void in a radial direction through which air may flow axially at a location radially outward from the first circumferential edge and the second circumferential edge.

10. The gas turbine engine of claim 9, wherein:
the first plate has a first joint feature on the first circumferential edge; and
the second plate has a second joint feature on the second circumferential edge that is positioned at least partially adjacent the first joint feature in an axial direction.

11. The gas turbine engine of claim 10, wherein the first joint feature and the second joint feature are shiplap edges.

12. The gas turbine engine of claim 10, wherein the first plate and the second plate each have a first distance in the axial direction and the first joint feature and the second joint feature each have a second distance in the axial direction that is between 40% and 50% of the first distance.

13. The gas turbine engine of claim 10, wherein the first joint feature and the second joint feature prevent air from flowing between the first plate and the second plate.

14. The gas turbine engine of claim 9, wherein:
the first plate further includes an inner diameter edge;
the first outer diameter edge includes a first outer segment separated from the first middle segment by the first protrusion; and
a first distance between the first middle segment of the first outer diameter edge and the inner diameter edge is greater than a second distance between the first outer segment of the first outer diameter edge and the inner diameter edge.

15. The gas turbine engine of claim 9, wherein the first plate and the second plate define a concavity centered around an intersection of the first plate and the second plate such that the concavity may direct a flow of air radially outward from the concavity and axially aft through the concavity.

* * * * *